(12) United States Patent
Hayworth

(10) Patent No.: US 6,877,757 B2
(45) Date of Patent: Apr. 12, 2005

(54) PIVOTING FIFTH WHEEL HITCH TRAILER PIN ASSEMBLY

(76) Inventor: Dwayne Hayworth, c/o Suite 4615 Canterra Tower 440 Third Avenue S.W., Calgary, Alberta (CA), T2P 4H2

( * ) Notice: Subject to any disclaimer, the term of this patent is extended or adjusted under 35 U.S.C. 154(b) by 0 days.

(21) Appl. No.: 10/604,348

(22) Filed: Jul. 14, 2003

(65) Prior Publication Data

US 2004/0104556 A1 Jun. 3, 2004

(30) Foreign Application Priority Data

Jul. 12, 2002 (CA) .......................................... 2,392,663

(51) Int. Cl.$^7$ .............................................. B62D 53/08
(52) U.S. Cl. ................................... 280/438.1; 280/515
(58) Field of Search .................................. 280/515, 433, 280/438.1, 441.1, 478.1, 492, 504

(56) References Cited

U.S. PATENT DOCUMENTS

| | | | | |
|---|---|---|---|---|
| 2,857,174 A | * | 10/1958 | Brown | 280/438.1 |
| 2,925,286 A | * | 2/1960 | Hodges, Jr. et al. | 280/434 |
| 3,893,712 A | | 7/1975 | Sallier | 280/440 |
| 3,897,086 A | * | 7/1975 | Breford | 280/438.1 |
| 3,899,194 A | | 8/1975 | Breford | 280/438 |
| 4,183,548 A | | 1/1980 | Schneckloth | 280/433 |
| 4,418,934 A | * | 12/1983 | Mickey | 280/438.1 |
| 4,921,266 A | | 5/1990 | Beals | 280/415.1 |
| 4,955,631 A | * | 9/1990 | Meyer | 280/438.1 |
| 5,000,472 A | | 3/1991 | Vick, Jr. | 280/420 |
| 5,011,178 A | | 4/1991 | Sanderson | 280/483 |
| 5,058,915 A | | 10/1991 | Burns | 280/441.2 |
| 5,356,167 A | | 10/1994 | Hall et al. | 280/492 |
| 5,529,329 A | | 6/1996 | McCoy | 280/438.1 |
| 5,839,745 A | | 11/1998 | Cattau et al. | 280/434 |
| 5,947,503 A | | 9/1999 | Tompkins | 280/455.1 |
| 6,024,372 A | | 2/2000 | Colibert et al. | 280/417.1 |
| 6,581,951 B2 | | 6/2003 | Lange | 280/440 |
| 2003/0019643 A1 | | 1/2003 | Pyle | 172/439 |

FOREIGN PATENT DOCUMENTS

| | | |
|---|---|---|
| CA | 2256658 | 12/1998 |
| CA | 2399549 | 8/2002 |

* cited by examiner

*Primary Examiner*—Avraham Lerner
(74) *Attorney, Agent, or Firm*—Bennett Jones LLP

(57) ABSTRACT

A fifth wheel trailer pin assembly characterized by having a horizontally pivoting joint to reduce the transmission of lateral flex and stress between the units coupled by the hitching assembly. The trailer pin assembly is designed to be used with conventional fifth wheel locking assemblies, which are designed to allow for horizontal rotation of the trailer pin within the locking assembly and far longitudinal pivoting between the units coupled by the hitching assembly, to provide a fifth wheel hitching system which minimizes the transmission of unwanted forces and stresses between the units that are coupled together.

4 Claims, 3 Drawing Sheets

PIVOTING FIFTH WHEEL HITCH TRAILER PIN ASSEMBLY

CROSS REFERENCE TO RELATED APPLICATIONS

This application claims the priority benefit of Canadian Patent Application No. 2,392,663 filed on Jul. 12, 2002 and entitled Pivoting Fifth Wheel Hitch Trailer Pin Assembly.

BACKGROUND OF INVENTION

The invention pertains to trailer hitches and more particularly to fifth wheel trailer hitches. More specifically, the invention relates to trailer pin assembly portion of a fifth wheel hitching system.

Fifth wheel trailer hitches have long been used to connect the tractors of semitruck combinations, or smaller trucks, to a trailer. Commonly a fifth wheel trailer hitch system consists of a fifth wheel locking assembly which is mounted on the truck and a fifth wheel trailer pin assembly which is mounted on the trailer.

Conventional fifth wheel trailer pin assemblies consist of a kingpin and skid plate, which are attached to the trailer. When the kingpin enters a jawslot in a fifth wheel locking assembly the locking assembly firmly closes on the kingpin, thus mating the trailer pin assembly and the locking assembly into the complete fifth wheel trailer hitch system.

A problem suffered by conventional fifth wheel hitching systems is that there is no horizontal flex for accommodating siderocking movement about the axis which generally extends from the front of the towing vehicle to the rear of the trailer. Therefore it can be very difficult to couple, or uncouple, the towing vehicle and the trailer when they are at differing cants due to uneven ground. Further, undesirable forces can be transferred from the truck to the hitching system and to the trailer (and vice versa), thus increasing wear and tear on all components and increasing the likelihood of a component failure.

Previous inventors have addressed the lack of horizontal flex in conventional fifth wheel hitching assemblies by devising a fifth wheel locking assembly which is capable of pivoting horizontally as well as vertically. The difficulty with this type of solution is that the locking assembly is the most complex part of the hitching assemble and therefore required a complex invention to add the capability of horizontal flex to the locking assembly.

SUMMARY OF INVENTION

Pivoting fifth wheel hitch trailer pin assembly invention for which this patent application is for, solves the conventional fifth wheel hitching assembly's lack of horizontal flex by having a horizontally pivoting joint in the fifth wheel trailer pin assembly. The pivoting joint allows for the kingpin of an uncoupled trailed to be easily alined with the slot in the fifth wheel locking assembly and the pivoting joint reduces the transmission of lateral forces and stress between units coupled by the hitching assembly.

The pivoting fifth wheel hitch trailer pin assembly provides a mechanically simple solution to the lack of horizontal flex problem. The simplicity of the pivoting fifth wheel hitch trailer pin assembly reduces the cost of production and reduces the number of parts which may be susceptible to structural failure.

With the pivoting fifth wheel hitch trailer pin assembly when the towing unit and the trailer unit are not connected the pivoting joint in the pivoting fifth wheel hitch trailer pin assembly allows the kingpin to be easily aligned with the slot in the fifth wheel locking assembly, even when not on level ground. When a towing unit and a trailer unit are connected with the pivoting fifth wheel hitch trailer pin assembly, each unit is able to orientate itself with the ground without being adversely affected by the orientation of the unit to which it is coupled to.

DETAILED DESCRIPTION

Figure 1:
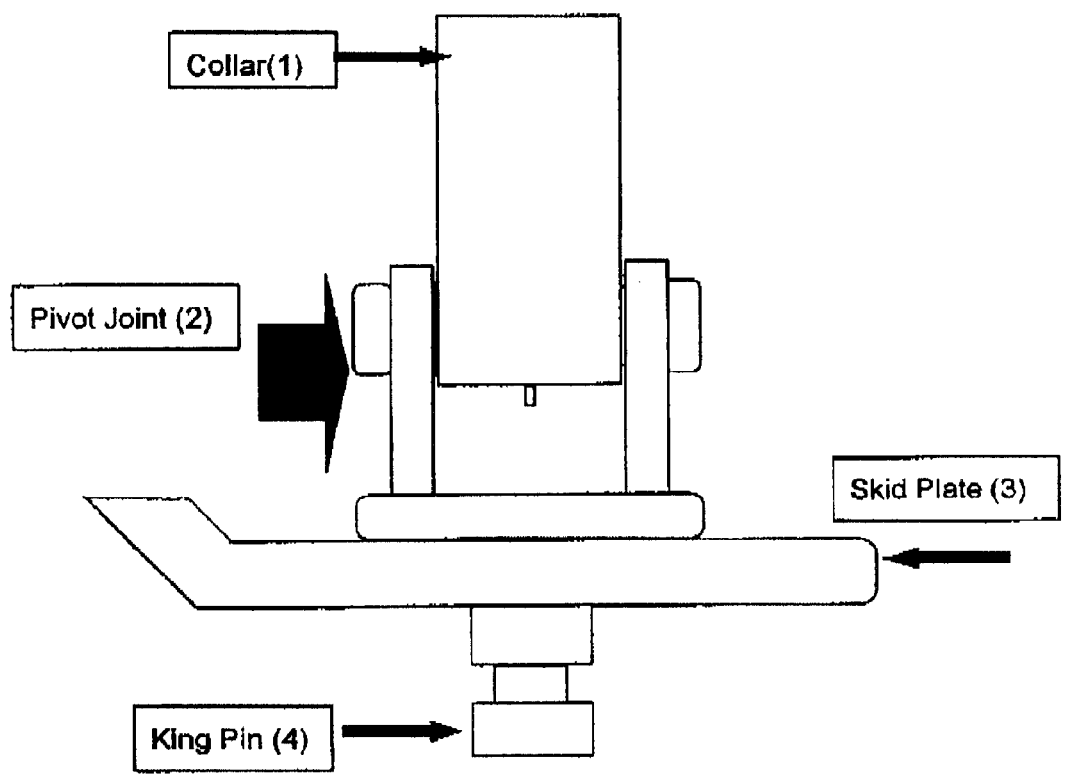
FIG. 1 shows a side view of the apparatus.
Figure 2:
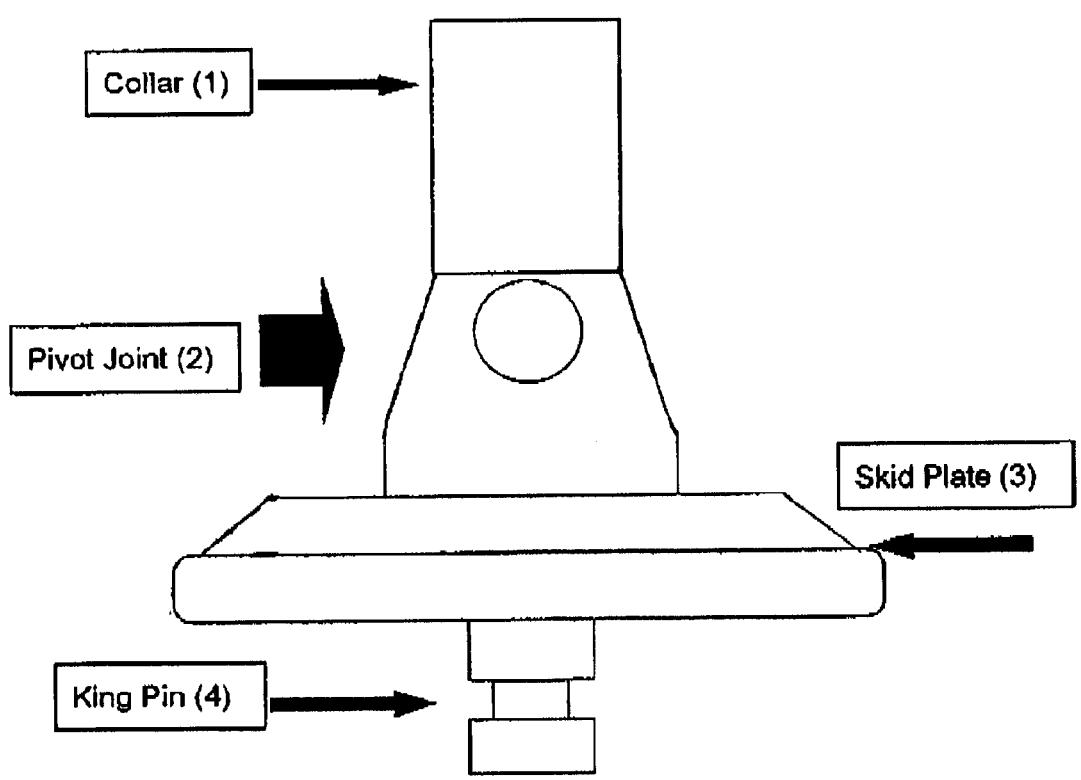
FIG. 2 shows a 50% cross sectional side view of the apparatus revealing a more detailed viewing of the pivot joint.

With reference to FIG. 1, the apparatus consists of a standard collar (1) which may be attached to a trailer by a variety of existing means, a pivoting joint (2) which is the novel feature of the apparatus and provides for the horizontal flex in the trailer pin assembly, a conventional skid plate (3), and a conventional king pin (4) which is to be inserted into the locking jaws of a fifth wheel locking assembly.

Figure 3:
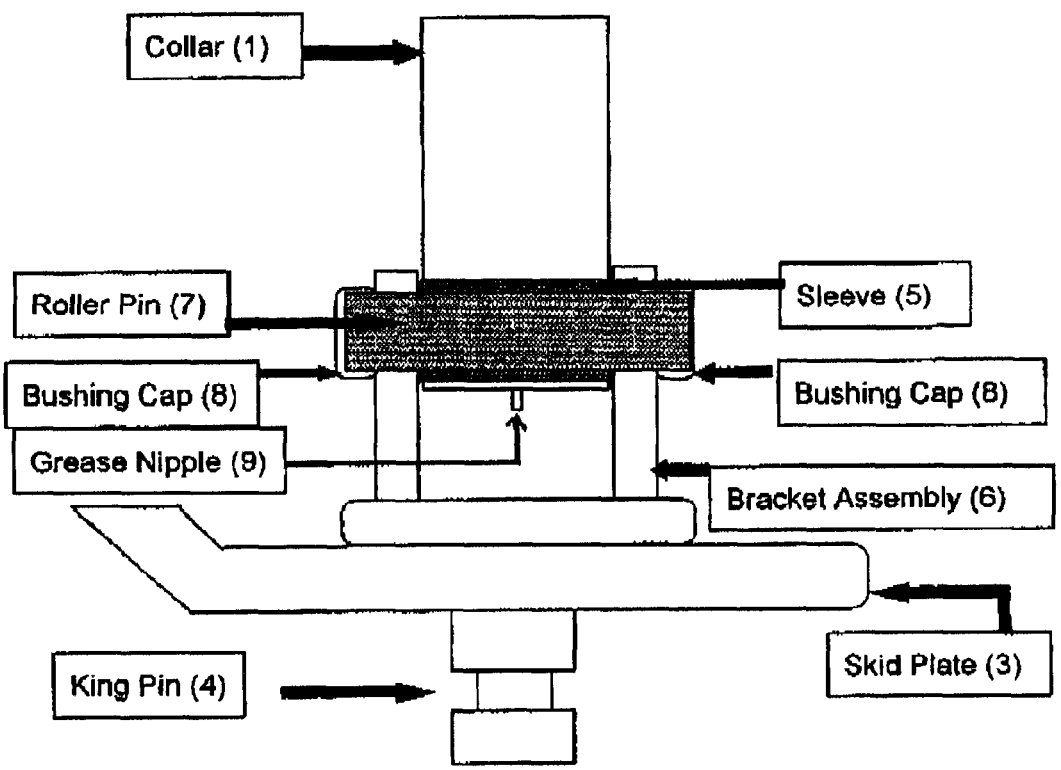
FIG. 3 shows a front view of the apparatus.

As more clearly shown in FIG. 3, the pivot joint consists of a cylindrical sleeve (5) which passes horizontally along the fore and aft axis through the collar (1), a bracket assembly (6) which is attached to the skid plate (3), a roller pin (7) which is inserted into the sleeve (5) and through both arms of the bracket assembly (6) and is secured in each arm of the bracket assembly by two bushing caps (8). In this shown embodiment a grease nipple (9) is provided to allow for lubrication to be inserted through a drilled passageway into the space between the sleeve (5) and the roller pin (7) which allows for the roller pin (7) to rotate within the sleeve (5), providing horizontal flex in the fifth wheel hitching system to accommodate siderocking movements and reducing the transfer of horizontal twisting forces.

Although the invention is described in terms of the illustrated embodiment, various changes and modifications may be made to the illustrated embodiment without departing from the spirit or scope of the invention.

What is claimed is:

1. A fifth wheel hitch trailer pin assembly, for connecting a trailer to a towing vehicle equipped with a fifth wheel locking assembly, comprising:
    (a) a collar attached to the trailer;
    (b) a king pin assembly comprising a king pin affixed to the bottom of a skid plate, and a bracket assembly comprising plates substantially perpendicular to a longitudinal axis that extends from the towing vehicle to the rear of the trailer;
    (c) means for pivotally attaching the collar to the bracket assembly about the longitudinal axis, wherein said means comprises a pivot joint comprising:
        i. a sleeve situated through the collar;
        ii. a roller pin situated inside and able to rotate within the sleeve, which extends through both the collar and the bracket assembly, which allows the collar to rotate with respect to the kingpin; and
        iii. bushing caps on both terminal ends of the roller pin;
    (d) the skid plate connected to the bottom of the bracket assembly.

2. The fifth wheel hitch trailer pin assembly of claim 1 in which the collar has a grease nipple connected to a passageway into said sleeve, allowing lubricant to be inserted in the space between the sleeve and the roller pin.

3. A pivot joint for a fifth wheel hitch trailer pin assembly having a collar, skid plate and king pin comprising:
  (a) a cylindrical sleeve situated through the collar oriented substantially horizontally and aligned with an axis that extends from the front of the trailer to the rear of the tractor;
  (b) a bracket assembly with plates positioned on both the front side and rear side of the collar about the axis that extends from the front of the towing vehicle to the rear of the trailer;
  (c) a roller pin situated inside and able to rotate within the sleeve, which extends past both the collar and the front side and rear side of the bracket assembly, which allows the collar to rotate with respect to the kingpin; and
  (d) bushing caps on both terminal ends of the roller pin.

4. A fifth wheel hitch trailer pin assembly of claim 3 in which the collar has a grease nipple connected to a passageway into said sleeve, allowing lubricant to be inserted in the space between the sleeve and the roller pin.

* * * * *